United States Patent [19]

Fairhurst

[11] Patent Number: 5,097,322
[45] Date of Patent: Mar. 17, 1992

[54] VIDEO ENCODING USING ADAPTIVE FILTERS AND VARIABLE THRESHOLD

[75] Inventor: Jon A. Fairhurst, Grass Valley, Calif.

[73] Assignee: The Grass Valley Group, Inc., Nevada City, Calif.

[21] Appl. No.: 570,232

[22] Filed: Aug. 20, 1990

[51] Int. Cl.⁵ .................... H04N 9/64; H04N 9/77
[52] U.S. Cl. .......................... 358/31; 358/39
[58] Field of Search ....................... 358/39, 31

[56] References Cited

U.S. PATENT DOCUMENTS

| | | | |
|---|---|---|---|
| 4,635,104 | 1/1987 | Hausdörfer | 358/39 |
| 4,638,351 | 1/1987 | Clarke | 358/39 |
| 4,656,502 | 4/1987 | Hausdörfer | 358/31 |
| 4,731,660 | 3/1988 | Faroudja et al. | 358/31 |
| 4,951,129 | 8/1990 | Lang | 358/31 |

FOREIGN PATENT DOCUMENTS

| | | | |
|---|---|---|---|
| 1186095 | 8/1986 | Japan | 358/31 |
| 63-63295 | 3/1988 | Japan | 358/31 |
| 2228190 | 9/1990 | Japan | |

*Primary Examiner*—Howard W. Britton
*Assistant Examiner*—Wendy R. Greening
*Attorney, Agent, or Firm*—John Smith-Hill

[57] ABSTRACT

An improved apparatus is provided for minimizing cross-color artifacts in the encoding and decoding of quadrature modulated color television signals during the encoding process, so that when the encoded video signals are decoded, such artifacts are minimized while a maximum amount of picture detail is preserved. A luminance signal is applied to both a delay element and an adaptive filter. The output of the delay element, a delayed luminance signal, is applied to a subtractor circuit. The output of the adaptive filter, an adaptive compensation signal, is applied to a variable limiter. Within the variable limiter, the adaptive compensation signal is applied to a rectifier/intergrator and a limiter circuit. The output of the rectifier/integrator, a cross-color activity signal, is sent to a scaler/combiner circuit top which is also optionally applied a chrominance activity signal. The scaler/combiner circuit weights these inputs with different factors before summing them. The output of the scaler/combiner circuit is a limiter control signal that is used to control how much of the adaptive compensation signal is applied to the subtractor circuit where it is substracted from the delayed luminance signal to produce a compensated luminance signal. A corresponding method is disclosed.

20 Claims, 6 Drawing Sheets

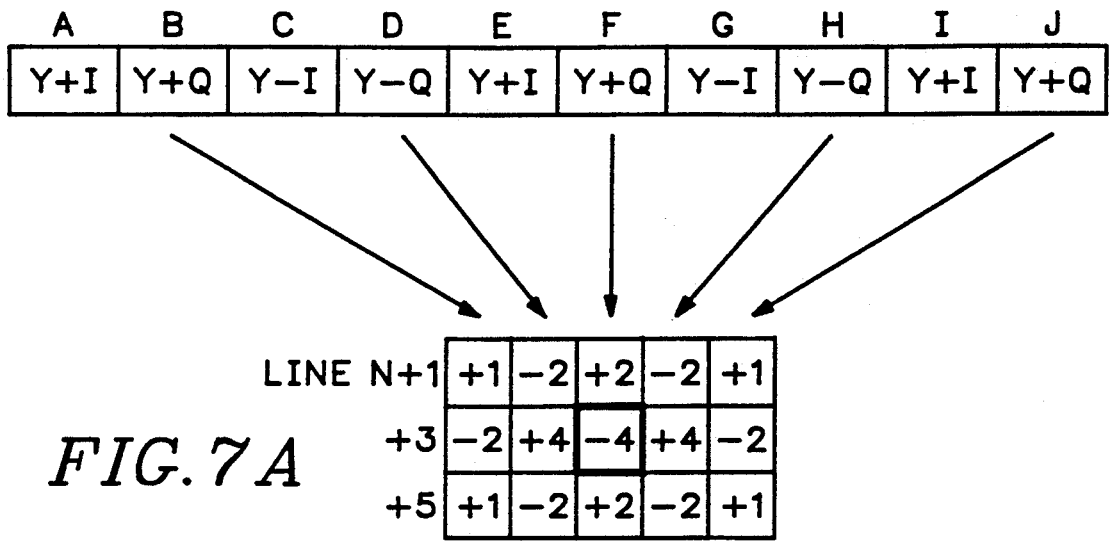
*FIG.7A*
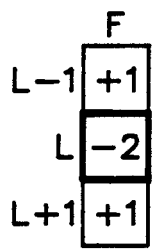
*FIG.7B*
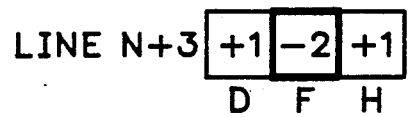
*FIG.7C*
| $Y_{CX}=$ | $Y_{CV} < Y_{CH}$ | $Y_{CV} \geq Y_{CH}$ |
|---|---|---|
| $Y_{CC} \geq 0$ | $Y_{CV}$ | $Y_{CH}$ |
| $Y_{CC} < 0$ | $Y_{CH}$ | $Y_{CV}$ |
*FIG.8*
| $Y_{cf}=$ | $Y_{CC} < Y_{CX}$ | $Y_{CC} \geq Y_{CX}$ |
|---|---|---|
| $Y_{CC}(+)$ AND $Y_{CX}(+)$ | $Y_{CC}$ | $Y_{CX}$ |
| $Y_{CC}(-)$ AND $Y_{CX}(-)$ | $Y_{CX}$ | $Y_{CC}$ |
| $Y_{CC}(-)$ X OR $Y_{CX}(-)$ | ZERO | ZERO |
*FIG.9*

VIDEO ENCODING USING ADAPTIVE FILTERS AND VARIABLE THRESHOLD

BACKGROUND OF THE INVENTION

This invention relates to the field of quadrature modulated color television picture signal encoding, and more particularly to the field of the prefiltering of encoded video signals to minimize cross-color and cross-luminance or dot crawl artifacts when the encoded video signals are subsequently decoded.

FIG. 1 is a graph of the frequency spectrum occupied by a typical quadrature modulated color television picture signal in accordance with the NTSC format. As is shown, luminance and chrominance information share the same spectrum.

A typical NTSC encoder is shown in FIG. 2 in block diagram form. The R (red), G (green) and B (blue) signal inputs come from a camera and are each applied to three matrices. The outputs of these matrices are luminance, Y, and two chrominance components, I and Q. The luminance bandwidth is typically limited to 4.2 MHz, the I component bandwidth is typically limited to 1.3 MHz, and the Q component bandwidth is typically limited to 0.6 MHz. The I and Q components are then impressed as carrier suppressed amplitude modulation components in phase quadrature upon a subcarrier at about 3.58 MHz. This subcarrier frequency is selected to result in a 180° phase shift from scanning line to adjacent scanning line, and from frame to frame, within the color television picture signal.

The quadrature modulated subcarrier is then added to the luminance carrier, and the resultant composite video signal is low pass filtered to 4.2 MHz. Addition of composite synchronization pulses, proper blanking, pedestal adjustments etc., results in a signal in accordance with the NTSC format.

Referring to FIG. 3, a detailed view of the frequency spectrum of an NTSC encoded color picture signal in the vicinity of the subcarrier shows the principle of "interleaving". Spectral rays of a typical television scene are grouped around integer multiples of the horizontal scanning frequency fh for the luminance information, while chrominance components are grouped around $(2n+1)/2$ fh (where n is an integer). For vertical components of a picture, this grouping is a very accurate representation of their spectral appearance, and separation of the chrominance and luminance components can be accomplished at the receiver using a comb filter without major difficulty.

However, the frequency interleaving is perfect only in the case of vertical transitions in the picture. Diagonal and horizontal transitions in the picture manifest an overlap of chrominance and luminance spectra, and the separation of the luminance and chrominance components in the receiver becomes much more difficult.

As a result of this imperfect separation of the luminance and chrominance components, certain luminance components are interpreted by the decoder in the receiver and decoded as color, resulting in "cross-color" patterns that are typically perceived as a moving rainbow accompanying diagonal luminance transitions, or as other inappropriate color activity in the proximity of luminance details.

Conversely, certain chrominance components are also interpreted by the receiving decoder and decoded as luminance. One or two lines of dots at the 3.58 MHz color subcarrier frequency are frequently noticeable in the luminance path for horizontal chrominance transitions derived from comb filter decoders. One possible solution is to place a 3.58 MHz trap in the luminance path, but doing so creates a poor frequency response, or a vertical dot pattern with vertical chrominance transitions, or both.

To prevent these problems at the receiver, it has become popular to process luminance and chrominance components by comb filter structures prior to their addition in an NTSC (or PAL) quadrature modulation encoder. As shown in FIG. 4, the frequencies that are in the vicinity of the chrominance subcarrier frequency are combed in the luminance path, while the entire chrominance spectrum is combed in the chrominance path. The circuit shown in FIG. 4 is fairly effective in reducing cross-color and cross-luminance artifacts. The spectral results achieved by this comb filter process are shown in FIG. 5A.

FIG. 5B shows the spectrum produced by an improved digital comb filter having additional delay elements. As delay elements are added, the steeper slopes on the "teeth" of the comb filter outputs result in decreased spectral overlap, as shown in FIGS. 5B and 5C.

In a two-dimensional digital comb filter with two increments of delay, luminance frequencies within the band of the chrominance subcarrier are averaged over three lines, and two adjacent pixels. Such a filter produces a negligible output for horizontal and vertical lines and edges. However, if a transition in luminance, such as an edge or line, is at 45°, it creates a ringing effect that disturbs the values in adjacent pixels along the transition.

U.S. Pat. No. 4,731,660 (Faroudja et al) hereby incorporated by reference, discloses one approach to reducing cross-color and cross-luminance patterns in the encoding of quadrature modulated color television picture signals by a means that is somewhat selective and therefore preserves more picture detail.

In this approach, referring to FIG. 6, the luminance component is applied to a comb filter 58 to produce a comb filtered luminance component, which is bandpass limited by a bandpass filter 56. The luminance component is also applied to a delay matching circuit 62. The output of the bandpass filter 56 is applied to both threshold circuit 78 and a rectifier/integrator 92. The output of rectifier/integrator 92 is a signal 94 that is representative of the level of cross-color activity over a recent interval, e.g. one microsecond.

This cross-color activity signal 94 is applied to a combiner circuit 95, along with another signal 80 that is representative of the chrominance activity. The output of the combiner circuit 95 is a control signal for the threshold circuit 78. The threshold circuit output is subtracted by a subtractor 60 from the delayed luminance component arriving from the delay matching circuit 62.

Whenever the levels of cross-color activity and chrominance activity are high, indicating that correction is required, the threshold control signal 98 adjusts the threshold circuit 78 and increasing quantities of comb filter 58 output are subtracted from the delayed luminance signal. Conversely, whenever the levels of cross-color activity and chrominance signal are low, indicating that minimal correction is needed, the threshold control signal 98 adjusts the output of the limiter to cause less energy to be subtracted from the delayed luminance signal. Thus, correction is only selectively applied at those times that the cross-color and chrominance level signals indicate that there is a problem requiring it, thereby reducing the amount of detail that is lost in the compensation process.

In co-pending patent application Ser. No. 07/294,235 (now U.S. Pat. No. 4,951,129), hereby incorporated by reference, another approach to reducing cross-color and cross-luminance patterns in the encoding of quadrature modulated color television picture signals is proposed. This application describes an improvement on the simple comb filter generally employed for detecting and compensating for cross-color and cross-luminance patterns.

In this approach, both the luminance and chrominance components are filtered using a two-dimensional (horizontal and vertical) filter, a vertical only filter, and a horizontal only filter as shown in FIGS. 7A–7C, respectively. A correction value is generated based on the outputs of each of these filters. For each pixel, the correction values are compared in a two-stage decision making process to decide which one to apply as the actual correction factor.

Referring to FIG. 7A, the first of these filters processes five adjacent pixels horizontally along three consecutive lines of video signal. The current pixel is in the center, and indicated by a heavier border. The arrows above this filter show how every other sample of luminance information (Y) for a given line corresponds to the same chrominance component, in this case Q. The numbers in each filter box indicate the weights that are applied to each pixel. All of the weighted values are added together and divided by either 32 or 16, depending on other circuit values and how strong a correction factor is desired.

The output of the two-dimensional filter, $Y_{cc}$, will be near zero in the absence of diagonal lines or edges. When a diagonal line or edge passes through the filter, however, $Y_{cc}$ assumes a value significantly greater than zero. Since diagonal lines and edges produce the greatest cross-color artifacts, $Y_{cc}$ is a good measure of their presence. As will be seen below in the discussion of the decision making process that uses the output of all three filters, the value $Y_{cc}$ is used to limit the filtering that is actually applied to the luminance signal.

The second, vertical filter is shown in FIG. 7B. It examines the relationship between the current pixel, shown in the darker central box, and the same pixel in adjacent lines vertically. The output of the vertical filter is $Y_{cv}$.

The third, horizontal filter is shown in FIG. 7C. It examines the relationship between the current pixel, shown in the darker central box, and the adjacent horizontal pixels in the same line. Again, only luminance pixels related to the same chrominance component are used, as was shown in FIG. 7A. The output of the horizontal filter is $Y_{ch}$.

The decision process is illustrated in FIGS. 8 and 9. A vertical edge or line results in a large value of $Y_{ch}$, but small values of both $Y_{cv}$ and $Y_{cc}$. Conversely, a horizontal edge or line results in a large value of $Y_{cv}$, but small values of both $Y_{ch}$ and $Y_{cc}$. Diagonal edges produce large values for both $Y_{cv}$ and $Y_{ch}$, but a smaller value for $Y_{cc}$. Diagonal lines produce relatively large values for all three filter outputs, but $Y_{cc}$ is generally the smallest. The decision process uses the smallest of these correction values or zero, thus limiting the prefiltering of the picture to only those pixels that require it and to the minimum magnitude necessary.

The first step in the decision making process is to determine an intermediate value $Y_{cx}$ based on the values of $Y_{cc}$, $Y_{cv}$, and $Y_{ch}$. As shown in FIG. 8, if $Y_{cc}$ is a negative number, the more positive value of $Y_{cv}$ or $Y_{ch}$ is assigned to be the intermediate correction value, $Y_{cx}$. $Y_{cx}$ may be either positive or negative. If $Y_{cc}$ is non-negative, the more negative value of $Y_{cv}$ or $Y_{ch}$ is assigned to be $Y_{cx}$.

Referring now to FIG. 9, the second step in this two stage decision process is to find a final correction value $Y_{cf}$ that is limited to be between zero and $Y_{cc}$. If $Y_{cx}$ is already between $Y_{cc}$ and zero, then $Y_{cx}$ is used as the final correction value $Y_{cf}$. Otherwise, $Y_{cx}$ is clipped to $Y_{cc}$ or zero to produce $Y_{cf}$. The final correction value $Y_{cf}$ is added to the current pixel when it arrives in the delayed luminance path to accomplish the prefiltering. This decision process attempts to keep the softening of the luminance signal to a minimum, while effectively removing the information that produces cross-color error.

Both of the approaches described above, the variable threshold of the U.S. Pat. No. 4,731,660 and the adaptive filter of the co-pending patent application Ser. No. 07/294,235 now U.S. Pat. No. 4,951,129, while improvements over the prior art as represented by FIG. 4, still leave something to be desired, in that they still tend to overreact to the presence of false indications of cross-color and dot-crawl problems, excessively dampening image detail. Even more discrimination in eliminating cross-color and cross-luminance artifacts is desired.

SUMMARY OF THE INVENTION

The present invention is a successful integration and improvement of the two methods described above for minimizing cross-color artifacts in the encoding and decoding of quadrature modulated color television signals, so that when the encoded video signals are subsequently decoded, such effects are minimized at the same time that image detail is further maximized.

According to one aspect of the invention, an apparatus is provided for minimizing cross-color artifacts in the encoding and decoding of quadrature modulated color television signals during the encoding process, so that when the encoded video signals are decoded such artifacts are minimized while a maximum amount of picture detail is preserved. A luminance signal is applied to both a delay element and an adaptive filter. The output of the delay element, a delayed luminance signal, is applied to a subtractor circuit. The output of the adaptive filter, an adaptive compensation signal, is applied to a variable limiter. Within the variable limiter, the adaptive compensation signal is applied to a rectifier/integrator and a limiter circuit. The output of the rectifier/integrator, a cross-color activity signal, is sent to a scaler/combiner circuit to which is also optionally applied a chrominance activity signal. The scaler/combiner circuit weights these inputs with different factors before summing them. The output of the scaler/combiner circuit is a limiter control signal that is used to control how much of the adaptive compensation signal is applied to the subtractor circuit where it is subtracted from the delayed luminance signal to produce a compensated luminance signal.

According to another aspect of the invention, a method is provided for minimizing cross-color artifacts in the encoding and decoding of quadrature modulated color television signals during the encoding process, so that when the encoded video signals are decoded such artifacts are minimized while a maximum amount of picture detail is preserved. The method includes the steps of: delaying the luminance signal, adaptively filtering the luminance signal to produce an adaptive compensation signal, rectifying and integrating the adaptive compensation signal to produce a cross-color activity signal, (optionally) combining the cross-color activity signal with a chrominance activity signal to produce a limiter control signal according to differing weighting factors, and using the limiter control signal to control how much of the adaptive compensation signal is subtracted from the delayed luminance signal.

BRIEF DESCRIPTION OF THE DRAWINGS

FIGS. 7A-7C are illustrations of weighted digital filters used for the luminance component in a co-pending patent application Ser. No. 07/294,235, FIG. 8 illustrates the first decision process used to determine which of the luminance correction values to use as the actual one in co-pending patent application Ser. No. 07/294,235, FIG. 9 illustrates the second decision process used to determine which of the luminance correction values to use as the actual one in co-pending patent application Ser. No. 07/294,235.

DETAILED DESCRIPTION

Figure 1:
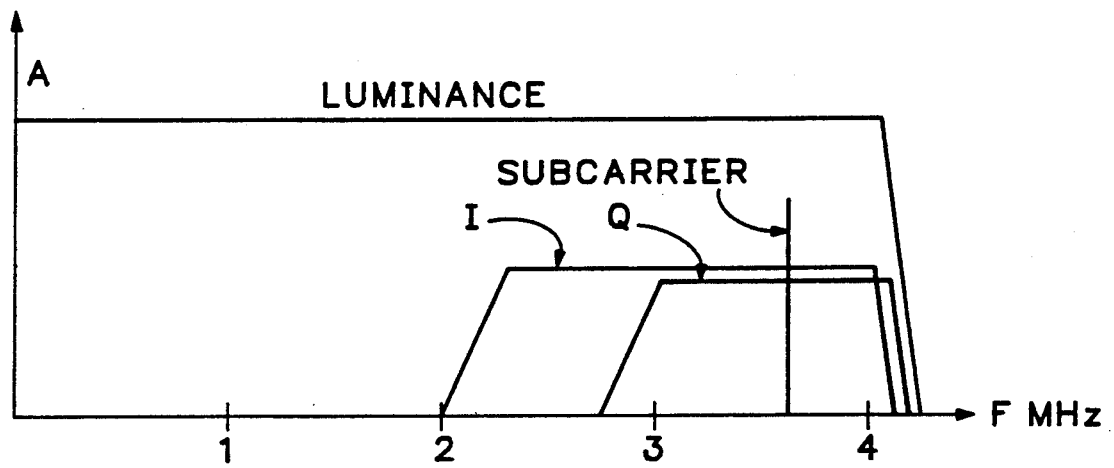
FIG. 1 is a graph of the frequency spectrum occupied by a typical quadrature modulated color television picture signal in accordance with the NTSC format.
Figure 2:
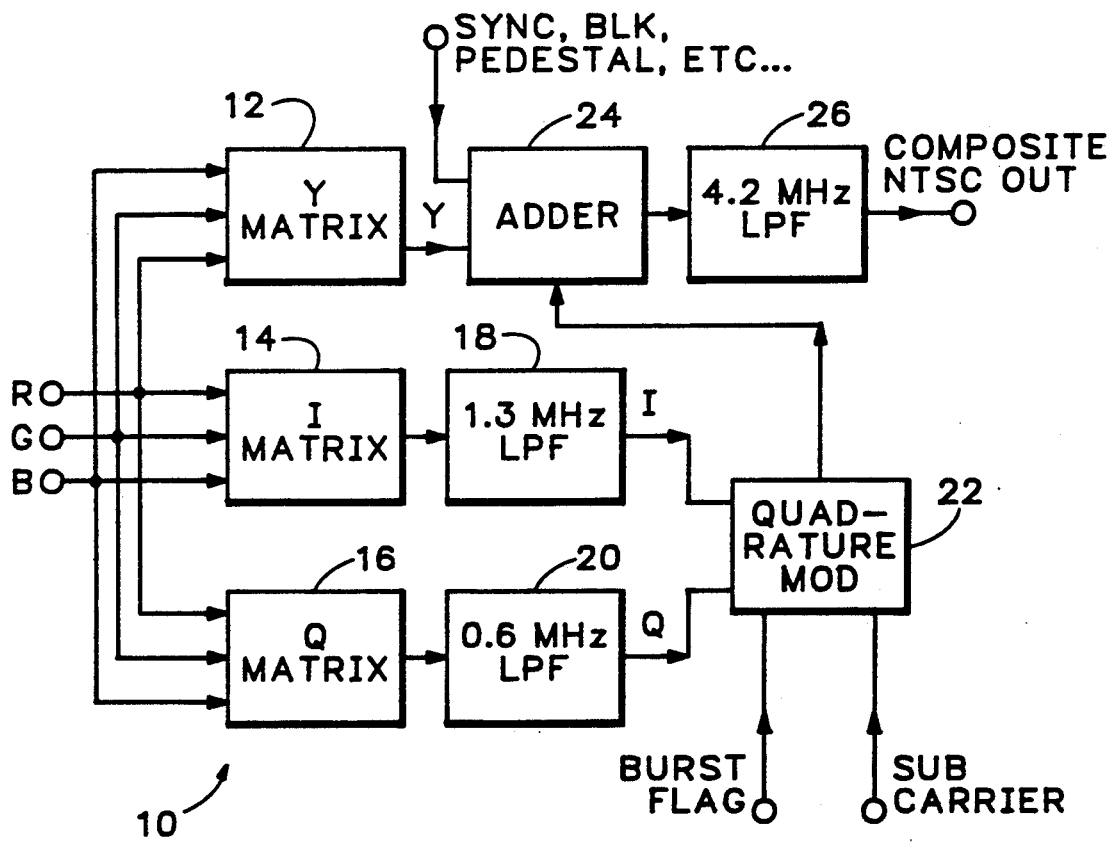
FIG. 2 is a block diagram of a conventional encoder for encoding a color television picture signal in accordance with the NTSC format.
Figure 3:
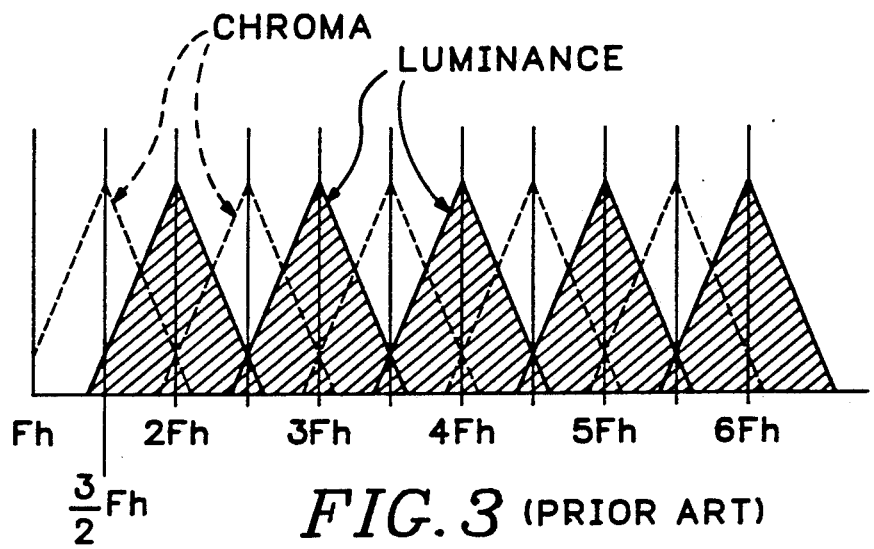
FIG. 3 is a greatly enlarged graph of a portion of the frequency spectrum occupied by a typical quadrature modulated NTSC color television picture signal in the vicinity of the subcarrier frequency.
Figure 4:
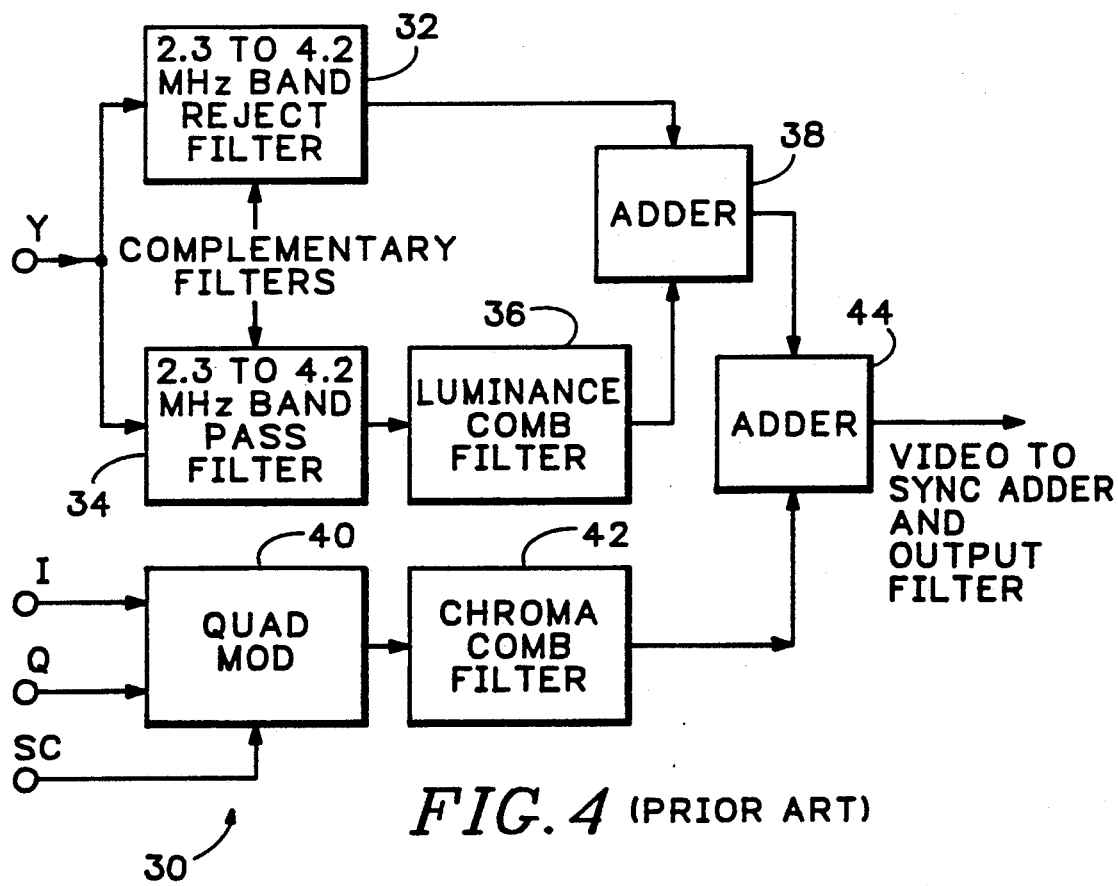
FIG. 4 is a block diagram of an improved (prior art) encoder that reduces unwanted cross-color and cross-luminance picture artifacts resulting from spectral overlap.
Figure 5A:
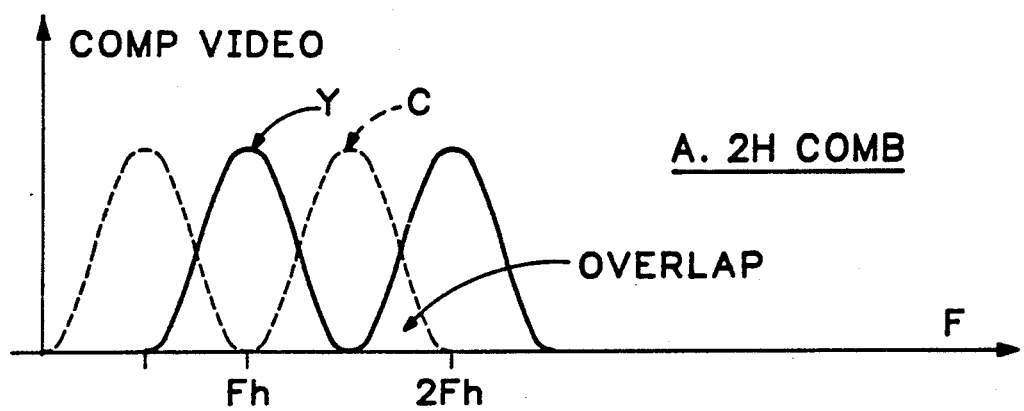
FIGS. 5A-5C are graphs of the frequency responses of comb filters with increasing numbers of delay elements.
Figure 5B:
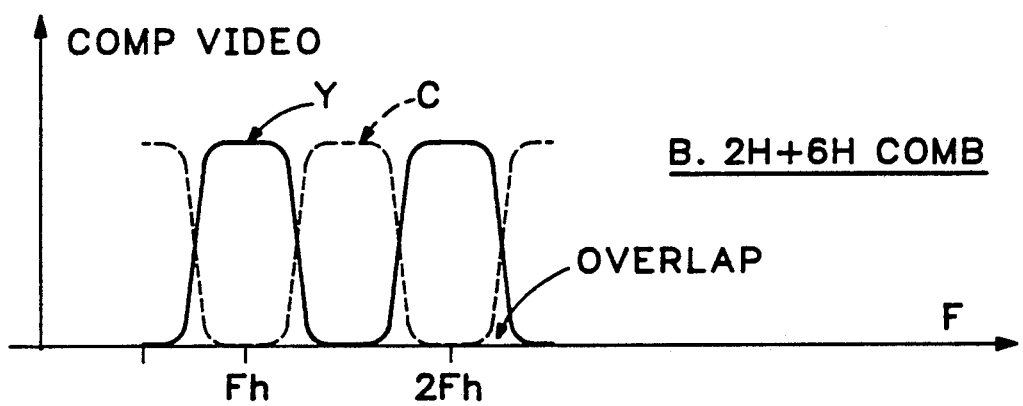
Figure 5C:
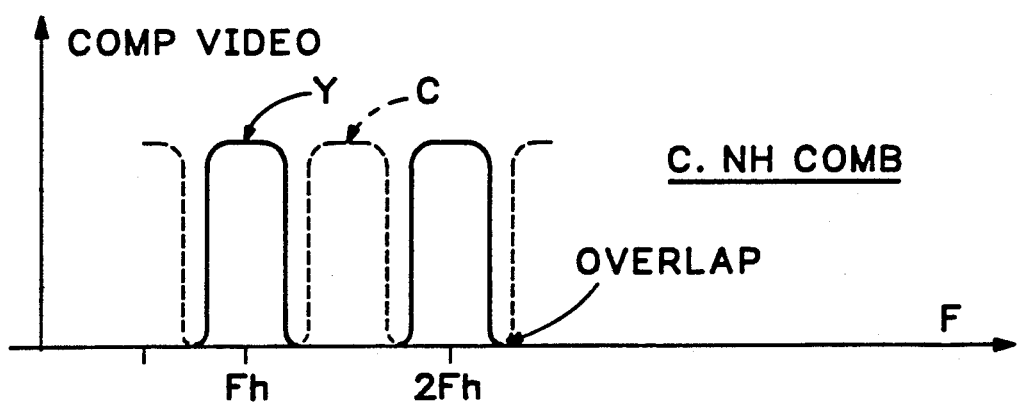
Figure 6:
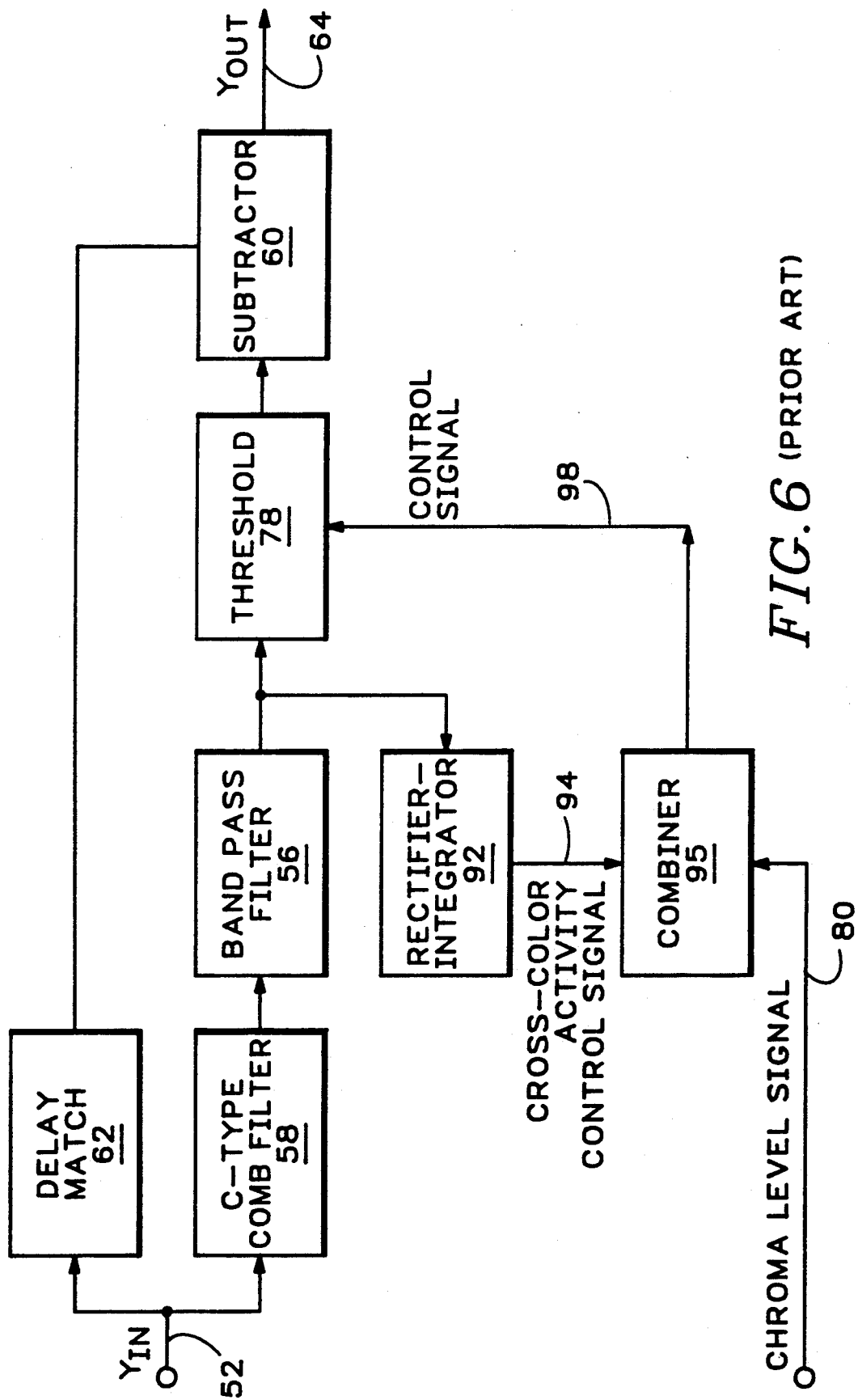
FIG. 6 is a block diagram of a further improved (prior art) encoder utilizing threshold control.
Figure 10:
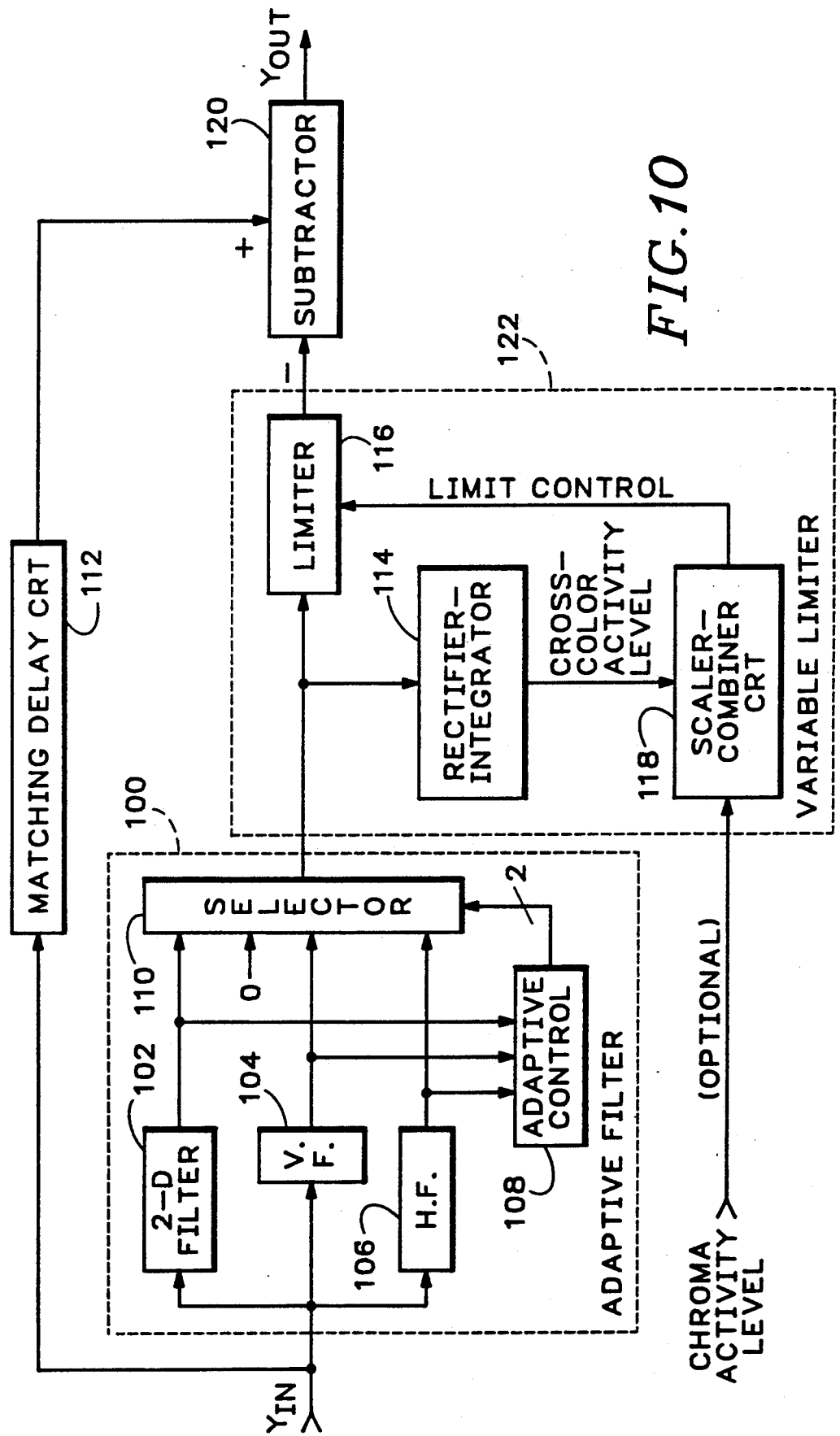
FIG. 10 is a block diagram of an improved compensation circuit for selectively subtracting an adjustment component from a luminance signal in a color television signal encoder according to the present invention.

Referring now to FIG. 10, an adaptive filter 100 according to the teachings of co-pending patent application Ser. No. 07/294,235 has replaced the comb filter 58 (FIG. 6) and bandpass filter 56 in the design disclosed in U.S. Pat. No. 4,731,660, and a variable limiter implementing a different function has replaced the threshold circuit 78, to provide a further improved compensation circuit for minimizing cross-color artifacts in the encoding and decoding of quadrature modulated color television signals, so that when the encoded video signals are subsequently decoded such effects are minimized at the same time that image detail is preserved.

An uncompensated luminance signal, $Y_{in}$, is applied to the input of an adaptive filter 100 and a matching delay circuit 112. The output of the matching delay circuit 112 is connected to the minuend input of subtractor 120. The $Y_{in}$ input to the adaptive filter 100 is applied to two-dimensional filter 102, vertical filter 104, and horizontal filter 106. The outputs of the two-dimensional filter 102, the vertical filter 104, and the horizontal filter 106 are all applied to different inputs of selector 110. One additional input to selector 110 is a constant zero.

The outputs of the two-dimensional filter 102, the vertical filter 104, and the horizontal filter 106 are also all monitored by adaptive control circuit 108. The output of the adaptive control circuit 108 is an adaptive control signal that provides two bits of control input to selector 110 to select among its four inputs. According to rules specified by the logic of the adaptive control circuit 108, the adaptive control signal selects at the selector 110 among the outputs of the three filters and zero to produce an adaptive compensation signal to be applied to a variable limiter 122.

As discussed above, the two step decision process is illustrated in FIGS. 8 and 9. A vertical edge or line results in a large value of $Y_{ch}$, but small values of both $Y_{cv}$ and $Y_{cc}$. Conversely, a horizontal edge or line results in a large value of $Y_{cv}$, but small values of both $Y_{ch}$ and $Y_{cc}$. Diagonal edges produce large values for both $Y_{cv}$ and $Y_{ch}$, but a smaller value for $Y_{cc}$. Diagonal lines produce relatively large values for all three filter outputs, but $Y_{cc}$ is generally the smallest. The decision process uses the smallest of these correction values or zero, thus limiting the prefiltering of the picture to only those pixels that require it and to the minimum magnitude necessary.

The first step in the decision making process is to determine an intermediate value $Y_{cx}$ based on the values of $Y_{cc}$, $Y_{cv}$, and $Y_{ch}$. As shown in FIG. 8, if $Y_{cc}$ is a negative number, the more positive value of $Y_{cv}$ or $Y_{ch}$ is assigned to be the intermediate correction value, $Y_{cx}$. $Y_{cx}$ may be either positive or negative. If $Y_{cc}$ is nonnegative, the more negative value of $Y_{cv}$ or $Y_{ch}$ is assigned to be $Y_{cx}$.

Referring now to FIG. 9, the second step in this two stage decision process is to find a final correction value $Y_{cf}$ that is limited to be between zero and $Y_{cc}$. If $Y_{cx}$ is already between $Y_{cc}$ and zero, then $Y_{cx}$ is used as the final correction value $Y_{cf}$. Otherwise, $Y_{cx}$ is clipped to $Y_{cc}$ or zero to produce $Y_{cf}$. The final correction value $Y_{cf}$ is added to the current pixel when it arrives in the delayed luminance path to accomplish the prefiltering. This decision process attempts to keep the softening of the luminance signal to a minimum, while effectively removing the information that produces cross-color error.

The variable limiter 122 operates to limit how much of the adaptive compensation signal is passed to subtractor 120, where it is used to diminish the delayed luminance signal from the matching delay circuit 112.

Internal to the variable limiter, the output of the selector 110 is applied to limiter 116 and rectifier/integrator 114. The integration interval of the rectifier/integrator 114 is nominally one microsecond in a preferred embodiment. The output of the rectifier/integrator 114 is a cross-color activity level signal that is applied to one input of scaler/combiner circuit 118. The other (optional) input to scaler/combiner circuit 118 is a signal indicative of the instantaneous chrominance activity level, i.e., a rectified version of the chrominance signal.

The scaler/combiner circuit 118, in a preferred embodiment, scales each input with a different factor, adds the resulting products together, and subtracts a dc offset from the result. The scale factors may weight the cross-color activity level signal to be larger than the chrominance activity level signal, e.g., twice as large. In some embodiments, the chrominance activity level is completely ignored (i.e., a factor of zero or no connection).

The limit control signal establishes the maximum amplitude, positive or negative, that the limiter circuit 116 can pass. For example, if the limit control signal has a value of 10 and the adaptive compensation signal has a value of −13, the output of the limiter circuit 116 is −10. A lower limit results in a diminished or zero adaptive compensation signal being applied to the subtrahend input of subtractor 120. A higher limit results in an increased or maximum adaptive compensation signal being applied to the subtrahend input of subtractor 120.

It will be appreciated that the invention is not restricted to the particular embodiment that has been described, and that variations may be made therein without departing from the scope of the invention as defined in the appended claims and equivalents thereof. For example, the same principles can be applied with minor modification to a system following the PAL (Phase Alternation Line) signal format. Or, the same principles could be applied to an analog implementation. Or, the scaler/combiner circuit 118 could implement a variety of functions, including: the square root of the sum of the squares of its inputs, the greater of its inputs, or the simple sum of its inputs. Other examples will undoubtedly occur to those skilled in the art.

I claim:

1. A compensation circuit for receiving a luminance signal in a color television signal encoder and producing a compensated luminance signal, the circuit comprising:
    delaying means for delaying the luminance signal;
    adaptive filtering means for adaptively filtering the luminance signal to produce an adaptive compensation signal;
    variable limiting means for variably limiting the adaptive compensation signal; and
    subtracting means for subtracting the variably limited adaptive compensation signal from the delayed luminance signal to produce the compensated luminance signal.

2. A compensation circuit according to claim 1 wherein the adaptive filtering means comprises:
    means for producing a plurality of filtered luminance signals; and
    means for selecting one of the plurality of filtered luminance signals to be the adaptive compensation signal depending on a characteristic of the plurality of filtered luminance signals.

3. A compensation circuit for receiving a luminance signal in a color television signal encoder and producing a compensated luminance signal, the circuit comprising:
    delaying means for delaying the luminance signal;
    adaptive filtering means for adaptively filtering the luminance signal to produce an adaptive compensation signal;
    variable limiting means for variably limiting the adaptive compensation signal; and
    subtracting means for subtracting the variably limited adaptive compensation signal from the delayed luminance signal to produce the compensated luminance signal;
    and wherein the adaptive filtering means comprises:
        two-dimensional filter means for filtering the luminance signal and producing a two-dimensional compensation signal;
        vertical filter means for filtering the luminance signal and producing a vertical compensation signal;
        horizontal filter means for filtering the luminance signal and for producing a horizontal compensation signal;
        adaptive control means for receiving the two-dimensional compensation signal, the vertical compensation signal, and the horizontal compensation signal and producing an adaptive control signal; and
        selecting means for receiving the two-dimensional compensation signal, the vertical compensation signal, the horizontal compensation signal and the adaptive control signal and producing the adaptive compensation signal.

4. A compensation circuit according to claim 3, wherein the selecting means operates according to rules and the rules comprise:
    if the two-dimensional compensation signal is negative, the more positive value of the vertical compensation signal and the horizontal compensation signal is assigned to be an intermediate compensation signal;
    if the two-dimensional compensation signal is non-negative, the more negative of the vertical compensation signal and the horizontal compensation signal is assigned to be the intermediate compensation signal;
    limit the intermediate compensation signal to be between zero and the two-dimensional compensation signal by making the intermediate compensation signal zero if the intermediate compensation signal is below zero or equal to the two-dimensional compensation signal if the intermediate compensation signal is above the two-dimensional compensation signal; and
    use the intermediate compensation signal as the adaptive compensation signal.

5. A compensation circuit for receiving a luminance signal in a color television signal encoder and producing a compensated luminance signal, the circuit comprising:
    delaying means for delaying the luminance signal;
    adaptive filtering means for adaptively filtering the luminance signal to produce an adaptive compensation signal;
    variable limiting means for variably limiting the adaptive compensation signal to produce a variably limited adaptive compensation signal; and
    subtracting means for subtracting the variably limited adaptive compensation signal from the delayed luminance signal to produce the compensated luminance signal; and wherein the variable limiting means comprises:
        rectifying and integrating means for receiving the adaptive compensation signal and producing a cross-color activity signal;
        signal scaling means for receiving the cross-color activity signal and producing a limit control signal; and
        limiting means for receiving the adaptive compensation signal and the limit control signal and limiting the adaptive compensation signal according to the limit control signal.

6. A compensation circuit according to claim 5, wherein the signal scaling means also receives a chrominance activity level signal and comprises a signal combining means that combines the chrominance activity level signal and the cross-color activity signal to produce the limit control signal.

7. A compensation circuit according to claim 6, wherein the scaling and combining means also comprises a dc offsetting means that offsets the limit control signal.

8. A compensation circuit according to claim 7, wherein the dc offset is negative.

9. A compensation circuit according to claim 6, wherein the signal scaling means weights the chrominance activity level signal with a first factor and the cross-color activity signal with a second factor.

10. A compensation circuit according to claim 9, wherein the second factor is twice or more times larger than the first factor.

11. A compensation method for compensating a luminance signal in a color television signal encoder and producing a compensated luminance signal, the method comprising the steps of:
   delaying the luminance signal;
   adaptively filtering the luminance signal;
   variably limiting the adaptive compensation signal; and
   subtracting the variably limited luminance signal from the delayed adaptive compensation signal to produce the compensated luminance signal.

12. A compensation method according to claim 11 wherein the adaptively filtering step comprises the steps of:
   filtering the luminance signal in a plurality of ways to produce a plurality of filtered luminance signals; and
   adaptively selecting one of the plurality of filtered luminance signals to produce an adaptive compensation signal depending on a characteristic of the plurality of filtered luminance signals.

13. A compensation method for compensating a luminance signal in a color television signal encoder and producing a compensated luminance signal, the method comprising the steps of:
   delaying the luminance signal;
   two-dimensionally filtering the luminance signal to produce a two-dimensional filtering compensation signal;
   vertically filtering the luminance signal to produce a vertical compensation signal;
   horizontally filtering the luminance signal to produce a horizontal compensation signal;
   selecting, based on the two-dimensional compensation signal, the vertical compensation signal, and the horizontal compensation signal, one of the two-dimensional compensation signal, the vertical compensation signal, the horizontal compensation signal, or zero to be the adaptive compensation signal;
   variably limiting the adaptive compensation signal; and
   subtracting the variably limited compensation signal from the delayed luminance signal to produce the compensated luminance signal.

14. A compensation method according to claim 13, wherein the selecting step comprises the steps of:
   assigning the more positive value of the vertical compensation signal and the horizontal compensation signal to be an intermediate compensation signal if the two-dimensional compensation signal is negative;
   assigning the more negative of the vertical compensation signal and the horizontal compensation signal to be the intermediate compensation signal if the two-dimensional compensation signal is non-negative;
   limiting the intermediate compensation signal to be between zero and the two-dimensional compensation signal by making the intermediate compensation signal zero if the intermediate compensation signal is below zero or making the intermediate compensation signal equal to the two-dimensional compensation signal if the intermediate compensation signal is above the two-dimensional compensation signal; and
   using the intermediate compensation signal as the adaptive compensation signal.

15. A compensation method for compensating a luminance signal in a color television signal encoder and producing a compensated luminance signal, the method comprising the steps of:
   delaying the luminance signal;
   adaptively filtering the luminance signal;
   rectifying and integrating the adaptive compensation signal to produce a cross-color activity signal that operates as a limit control signal;
   limiting the adaptive compensation signal according to the limit control signal; and
   subtracting the variably limited compensation signal from the delayed luminance signal to produce the compensated luminance signal.

16. A compensation method according to claim 15 further comprising the step of signal combining the cross-color activity signal and a chrominance activity level signal to produce the limit control signal.

17. A compensation method according to claim 16 further comprising the step of offsetting the limit control signal.

18. A compensation method according to claim 17, wherein the offset performed in the offsetting step is a negative offset.

19. A compensation method according to claim 16, wherein the signal combining step comprises the steps of weighting the chrominance activity level signal with a first factor and weighting the cross-color activity signal with a second factor.

20. A compensation circuit according to claim 19, wherein the second factor is twice or more times larger than the first factor.

* * * * *

UNITED STATES PATENT AND TRADEMARK OFFICE
CERTIFICATE OF CORRECTION

PATENT NO. : 5,097,322

DATED : March 17, 1992

INVENTOR(S) : Jon A. Fairhurst

It is certified that error appears in the above-identified patent and that said Letters Patent is hereby corrected as shown below:

Column 9, line 24, "luminance" should read --adaptive compensation--.

Column 9, line 25, "adaptive compensation" should read --luminance--.

Signed and Sealed this

Sixth Day of July, 1993

Attest:

MICHAEL K. KIRK

Attesting Officer

Acting Commissioner of Patents and Trademarks